No. 651,047. Patented June 5, 1900.
C. H. LEGGETT & F. STONE-BURROWS.
SPRAYER OR ATOMIZER.
(Application filed Sept. 18, 1899.)

(No Model.)

WITNESSES:
Fred White
Thomas F. Wallace

INVENTORS:
Clinton H. Leggett & Frank Stone-Burrows
By their Attorneys,
Arthur C. Fraser & Co.

THE NORRIS PETERS CO., PHOTO-LITHO., WASHINGTON, D. C.

UNITED STATES PATENT OFFICE.

CLINTON H. LEGGETT AND FRANK STONE-BURROWS, OF NEW YORK, N. Y., ASSIGNORS TO LEGGETT & BROTHER, OF SAME PLACE.

SPRAYER OR ATOMIZER.

SPECIFICATION forming part of Letters Patent No. 651,047, dated June 5, 1900.

Application filed September 18, 1899. Serial No. 730,816. (No model.)

*To all whom it may concern:*

Be it known that we, CLINTON H. LEGGETT, a resident of New York, borough of Manhattan, county of New York, and FRANK STONE-BURROWS, a resident of New York, borough of Brooklyn, county of Kings, State of New York, have invented certain new and useful Improvements in Sprayers or Atomizers, of which the following is a specification.

This invention relates to sprayers, atomizers, and vaporizers, and aims to provide an improved device of this kind especially applicable for spraying plants, trees, shrubs, or animals.

Many devices have heretofore been produced for applying a poisonous spray to vegetation or to animals to exterminate obnoxious and injurious insects. These are generally adapted to be carried in one hand and operated with the other hand and usually comprise a reservoir for the solution to be sprayed, a force-pump, and an atomizer or ejecting-nozzle.

Our present improvements relate to devices of this character, and our invention provides various features of improvement in construction and arrangement of parts, all of which will be fully hereinafter set forth.

Figure 1:
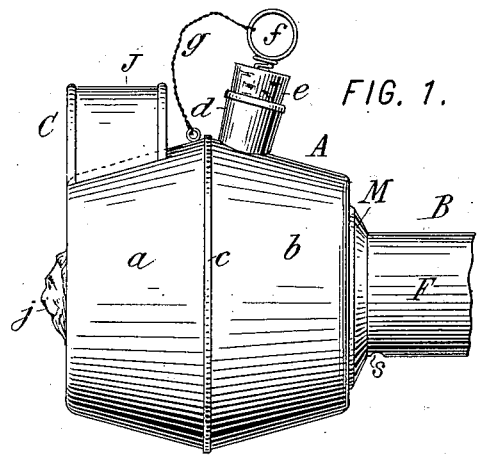
Figure 2:
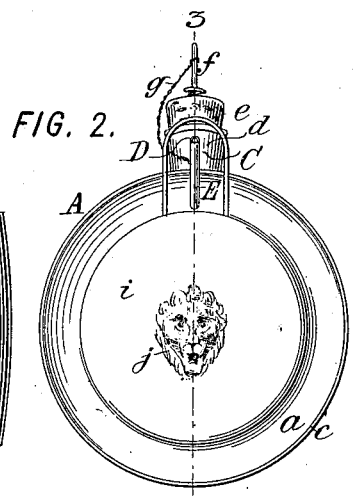
Figure 3:
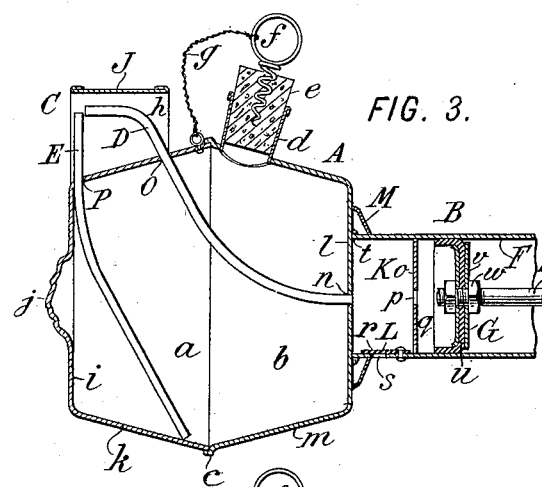
Figure 4:
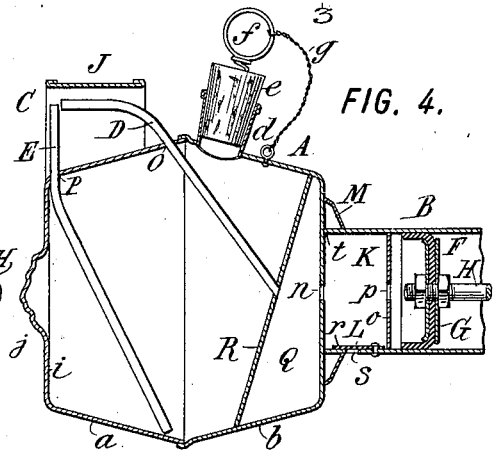
Figure 5:
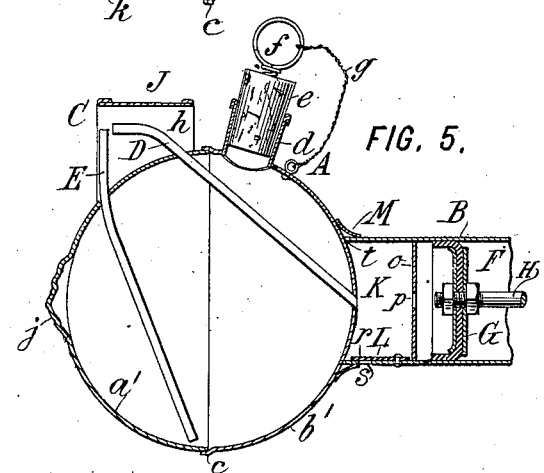
Figure 6:
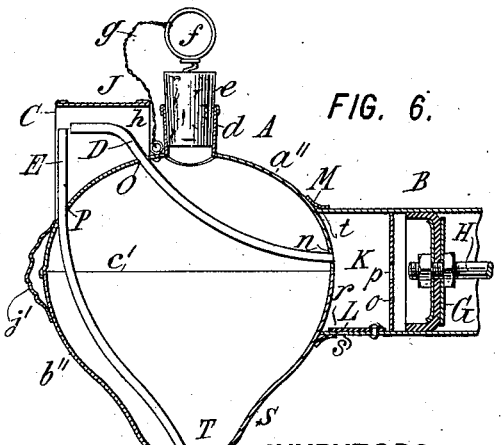

In the accompanying drawings, which illustrate certain adaptations of our invention, Figure 1 is a fragmentary side elevation showing the preferred form of our improved sprayer. Fig. 2 is an end elevation thereof. Fig. 3 is a fragmentary vertical axial section thereof cut on the line 3 3 of Fig. 2 and looking in the direction of the arrow. Fig. 4 is a similar section showing a modification. Fig. 5 is a similar section of another modification, and Fig. 6 is a similar section of still another modification.

Referring to the drawings, let A represent the reservoir; B, the pump; C, the atomizer; D, the air-tube; E, the liquid-tube; F, the pump-cylinder; G, the piston or plunger; H, its rod, and I the handle of our improved sprayer. These parts may be of any suitable construction, arrangement, or material in their general features and operation; but according to our invention they are constructed, arranged, and combined according to certain features of improvement which will hereinafter be set forth in detail with particular reference to the preferred form of our invention, as shown in Figs. 1 to 3 of the drawings.

According to one feature of improvement we place the reservoir and pump-cylinder in axial alinement, rigidly mounting the reservoir on the end of the pump-cylinder and concentrically therewith, thus obtaining great compactness and strength, as well as simplicity of parts and convenience of relative location. We preferably form the reservoir as a bulbous or globe-like body consisting of two concavo-convex members $a$ and $b$, united together at their edges at $c$, so that their whole interiors constitute the reservoir-chamber and their convex exteriors constitute the outer wall of the reservoir. One of these bodies is formed with an inlet $d$, through which the reservoir may be charged, which inlet is closed by a stopper $e$, having a handle $f$, which to prevent loss may be coupled to the neck of the inlet by a chain $g$. The other member constituting the reservoir is provided exteriorly with a guard-frame J, which bridges the atomizer C, having a chamber $h$ for inclosing the atomizer, which chamber opens through it from front to rear. The part $a$ in the construction shown in Figs. 1 to 3 has a flat circular front wall $i$, having a stamped ornamental central portion $j$ and surrounded by flaring walls $k$ in the form of a truncated cone, and the part $b$ has a flat perforated circular wall $l$, surrounded by flaring walls $m$, which at the joint $c$ between the parts embrace the walls $k$ of the other part for joining the two parts together.

The pump B is an elongated metal cylinder which according to our invention is rigidly connected to the rear side of the reservoir A and preferably has a pump-cylinder F, in which the plunger G works, and an auxiliary air-chamber K, in which is located the air-valve L, which chamber is interposed between the pump and the air-pipe D and serves both as a compression-chamber for storing compressed air and delivering it during the return stroke of the plunger as a valve-chamber for the pump and as a protecting-chamber for preventing any backflow of foreign matter through the air-pipe to the pump. The chamber K is best formed by fixing a partition o within the end of the cylinder F, the partition shown being a metal disk having a central perforation p, affording communication between the pump-chamber q and the compression-chamber K. This disk serves as a stop for limiting the downward thrust of the plunger G, and its perforation being at its center insures that no foreign matter shall pass from the chamber K into the pump so long as such matter does not substantially half fill the chamber K.

The valve L is placed at the bottom of the chamber K and is an ordinary clapper-valve, consisting of a piece of leather or tin r, fixed to the inner wall of the cylinder F and opening and closing over a hole s through this wall. Should any foreign matter get in the chamber K, the user can raise the valve by inserting any implement in the hole and permit such matter to escape.

The end t of the cylinder preferably terminates at right angles to its longitudinal axis and abuts squarely against the wall l of the reservoir, to which it is soldered. For greater strength a beveled annulus M surrounds this end of the cylinder and is soldered thereto and to the adjacent wall l, thus making an extremely-strong joint, as well as one of neat appearance.

The plunger G consists of a flexible cupped leather or other washer u, clamped between disks v, held by nuts w on the screw-threaded end of the stem H. The rear end of the cylinder F is closed by a wooden or other block N, fixed in place by a screw x through an aperture y, in which block the stem H projects. The handle I is suitably fastened on the end of the stem.

z is an aperture at the rear end of the cylinder F for permitting ingress and egress of air therefrom to avoid resistance to the movement of the plunger by reason of confined or rarefied air at rear thereof.

The atomizer C comprises certain improvements in that the air-tube D passes through the interior of the reservoir A, starting from the rear concentrically of the chamber K and extending thence in long sweeping curves through the reservoir and out of an aperture O in the top of the front member A within the chamber h of the hood J, where the forward end of the tube D projects forwardly in a line parallel with the axis of the pump. The liquid-tube E rises from the bottom of the reservoir and extends upwardly within the latter to the top thereof, where adjacent to the front wall i it passes through an aperture P within the chamber of the hood and rises at right angles to the forward of the air-tube, terminating opposite the latter in such relation thereto that when air is blown out of the air-tube it will act as an ejector to suck liquid out of the reservoir and spray it forwardly in front of the sprayer.

In operation the user will grasp the cylinder of the pump with one hand and the pump-handle with the other hand, holding the device by the pump-cylinder as a handle and operating it by reciprocating the pump-plunger with any desired rapidity or force. The spray can be directed in any direction by pointing the reservoir end of the sprayer in the direction desired. The reservoir will be filled from time to time with the solution to be sprayed, and during operation the pump-cylinder will be kept clean by the chamber K, so that there will be no unnecessary resistance to the operation of the plunger and undue wear of the cupped leather packing will be avoided. Should any foreign matter flow back into the chamber K, it will be collected therein and can be expelled from time to time by either opening the valve L or by holding the device vertically with the reservoir end down and depressing the pump-plunger, which will expel any matter within the chamber K through the air-pipe D, the rear end of which may be flush with the face of the wall l, as shown, to permit this.

The shape of the reservoir and of the pump and their manner of connection are such that the device can be inserted between the limbs and branches of vegetation and shrubbery without danger of entanglement therewith or of injury to the most delicate plants. The protecting-hood for the atomizer insures its tubes against displacement or injury, and its chamber gives a free air-space, the longitudinal extension of which corresponds with the direction of the jet of spray, so that air can freely flow through the hood, and there will be no impairment of such jet through lack of sufficient air-current around it.

It will be seen that our invention provides improvements which can be readily and advantageously availed of, producing a sprayer which is cheap, strong, compact, and easy of manipulation and one which can be variously and advantageously employed, and it will be understood that the invention is not limited to the particular details of construction, arrangement, and combination set forth as constituting its preferred form, since it can be employed according to such modifications as circumstances or the judgment of those skilled in the art may dictate without departing from the spirit of the invention.

One modification is shown in Fig. 4, in which a second auxiliary chamber Q is provided between the compressed-air chamber K and the reservoir A, this chamber Q being formed by a diagonal partition R, dividing the interior of the member b of the reservoir. The aperture n communicates between the chambers K and Q, and the air-pipe D terminates within the chamber Q. In other respects this construction is the same as that before described, the object of the two chambers being to obtain a greater air-storage capacity and greater protection against access of foreign matter to the valve in the chamber K. The parts in Fig. 4 bear the same letters of reference as do corresponding parts in Figs. 1, 2, and 3.

Another modification is shown in Fig. 5, in which the reservoir A is formed as a globe or sphere, its front and rear parts $a'$ $b'$ being hemispherical and united at their edges at $c$, as before described. The pump B here has the same construction at that described with reference to Fig. 1, the end $t$ of the pump resting against the convex interior of the part $b'$ and secured thereto by solder and by a reinforced collar M, as before described, so that a valve and air-storage chamber K are provided between the rear wall of the reservoir and the partition $o$ in the pump-cylinder F. The other features of construction are the same as those described with reference to Figs. 1, 2, and 3 and bear the same reference-letters.

In the modification shown in Fig. 6 the reservoir consists of two dissimilar parts, which instead of being united on a plane at right angles to the axis of the pump, as are the two parts of the reservoirs previously described, are joined on a plane parallel with and in line with the longitudinal axis of the pump, as seen at $c'$. Thus the one part $a$ is the top and the other part $b$ is the bottom of the reservoir. An ornamental casting $j'$ covers the joint between these parts in front. The top part $a$ has substantially the form of a segment of a sphere, while the bottom part $b$ has approximately the same form, but has a bulge or depression S at its lower side, the hollow interior of which constitutes a pocket T, which is at the bottom when the device is held in a horizontal position and within which the lower end of the liquid-pipe terminates, whereby practically all of the contents of the reservoir can be collected in this pocket and discharged through the liquid-pipe in operation. The end $t$ of the pump-cylinder is soldered to the reservoir in such manner that it crosses the joint between the two parts thereof and is attached to each part. In this construction the inlet $d$ and the apertures $n$, O, and P are all formed in the upper half $a$. In other respects this construction is similar to those before described and bears the same letters of reference as the construction shown in Figs. 1 to 3.

It will be seen that the liquid-pipe terminates at or near the bottom of the reservoir in each instance and also at a point so far inwardly from the front end of the reservoir that while the pipe serves to gather all the contents of the reservoir when the device is held horizontally for spraying the user can at any time hold the device vertically for transportation without danger of losing any of the contents of the reservoir when the latter is not more than half full, also that should it be desired to transport the device when the reservoir is fully charged and to operate the pump without danger of losing any of the liquid it will simply be necessary to invert the device, which will bring the intake end of the liquid-pipe to the top of the reservoir, whereupon the user can operate the pump to test the valves or to clean out the air-pipe without necessarily spraying any of the charge.

What we claim is—

1. In sprayers, the combination with a pump comprising a cylinder and a reciprocating plunger therein, of a reservoir crossing the end of said cylinder and coaxial therewith for containing the material to be sprayed, said reservoir composed of two hollow parts so united as to form a joint at the middle of said reservoir, and an atomizing device comprising an air-pipe communicating with said pump, and a liquid-pipe communicating with said reservoir for spraying the contents of the latter.

2. In spraying devices, the combination with a pump-cylinder, of a circular reservoir of greater diameter than said cylinder, fixed against the end thereof in axial alinement therewith and having a wall crossing said cylinder, a plunger in said cylinder, and an atomizer consisting of an air-pipe communicating with said cylinder, and a liquid-pipe communicating with said reservoir.

3. In spraying devices, the combination with a pump-cylinder and a reservoir, of a chamber between said parts, a partition between said chamber and cylinder having an aperture affording communication to the chamber, a valve in said chamber opening to the outer air for removal of foreign matter, and an atomizer consisting of an air-pipe communicating with said chamber, and a liquid-pipe communicating with said reservoir for atomizing the contents of the latter.

4. In spraying devices, the pump B, in combination with a reservoir concentric therewith, a chamber K between said reservoir and pump, an atomizer C mounted on said reservoir, and a hood J fixed on said reservoir over said atomizer, and having a passage $h$ extending through it, and a valve L in said chamber.

In witness whereof we have hereunto signed our names in the presence of two subscribing witnesses.

CLINTON H. LEGGETT.
FRANK STONE-BURROWS.

Witnesses:
GEORGE H. FRASER,
RENÉ BRUINE.